大专利

3,557,245
POLYMERIC ANTIOXIDANTS FOR ELASTOMERS AND RUBBERS

Leslie Nathan Phillips, Farnborough, David Kenneth Thomas, Farnham, and William Walter Wright, Farnborough, England, assignors to Minister of Technology in Her Britannic Majesty's Government of the United Kingdom of Great Britain and Northern Ireland, London, England No Drawing. Filed Sept. 11, 1967, Ser. No. 666,969
Claims priority, application Great Britain, Sept. 12, 1966, 40,674/66
Int. Cl. C08g 33/06, 45/10
U.S. Cl. 260—824                                    10 Claims

ABSTRACT OF THE DISCLOSURE

Silicone type rubber compositions are provided having, as the antioxidant, polymeric material in which the repeating unit of the polymer chain is an —NH— group attached to a difunctional aromatic group.

---

This invention relates to improvements in rubber compositions and is concerned with the provision of antioxidants in rubber compositions which are incorporated therein in order to retard deterioration due to oxidation.

Various difficulties are associated with the use of antioxidants. Thus, for example, an antioxidant whilst being required to be chemically active in order to minimise oxidation of the rubber, must neither interfere to any material extent with the curing of the rubber nor react in an undesirable way with any other constituents incorporated in the rubber composition. These difficulties increase with an increase in the service temperature and widely used antioxidants such as the various aromatic diamines are in general too volatile to be used effectively at elevated temperatures greater than, say, 100° C.

The object of the present invention is to provide antioxidants for silicone type rubber compositions which do not interfere significantly with the curing of the rubber but can provide a satisfactory antioxidant activity even in service at elevated temperatures over 100° C. Antioxidants are also prone to be leached out by common solvents and an important advantage of antioxidants in accordance with the invention is that they are less liable to be leached out by solvents and can continue to protect rubber compositions exposed to solvents.

In accordance with the invention, an antioxidant for a silicone type rubber is in the form of an aromatic polymer which essentially has repeating units each consisting of an —NH— group attached to a difunctional aromatic group. At least alternate difunctional aromatic groups in the polymer chain must be condensed ring systems with at least 3 and preferably 4 rings. Where only alternate difunctional aromatic compounds are condensed ring systems the remaining difunctional aromatic groups may be single ring aromatic groups.

Polymeric antioxidants in accordance with the present invention may be prepared by simple condensation reaction between a diamino and a dihydroxy aromatic compound. Where the polymeric antioxidant comprises alternate single aromatic rings and condensed aromatic rings joined alternately by —NH— groups they may be prepared by reacting a dihydroxy single ring aromatic compound with a diamino condensed ring aromatic compound or by reacting a dihydroxy condensed ring aromatic compound with a diamino single ring aromatic compound. Particular polymeric antioxidants in accordance with the present invention have been prepared by reaction between hydroquinone and diaminopyrene or diamino anthraquinone.

By way of example the preparation of the copolymer of hydroquinone and diaminopyrene will now be described, followed by test results using the copolymer as an antioxidant.

EXAMPLE 1

Hydroquinone (1.65 g.) and 3.8 diaminopyrene (3.48 g.) are thoroughly mixed, placed in a suitable tube and n-tributyl phosphate (0.67 ml.) added. The tube is evacuated ($10^{-4}$ to $10^{-5}$ mm. Hg), sealed and heated at 260° C. for 25 hours. The crude reaction product is leached with methanol, filtered off and Soxhlet extracted with water (21 hours) methanol (45 hours) and ether (12 hours) to leave the polymeric product (4.36 g., yield 92%).

Three silica filled methyl vinyl silicone vulcanisates were prepared, two of which incorporated the polymeric antioxidant additive according to the invention prepared as above. The composition of the compounds is given in Table 1 below.

TABLE 1

|  | Parts by weight | | |
| --- | --- | --- | --- |
|  | Compound 1 | Compound 2 | Compound 3 |
| Methyl vinyl silicone polymer | 100 | 100 | 100 |
| Finely divided silica filler (Aerosil) | 20 | 20 | 20 |
| Organic peroxide catalyst (Varox) | 4 | 4 | 4 |
| Polymeric antioxidant | Nil | 2 | 4 |

The compounds were press cured for 1 hour to 160° C. and then open post cured in air without pressure for 24 hours at 200° C.

Compression set resistance

Compounds 1 and 2 were subjected to an initial 25% compression. The resulting compression set in the compounds over a period of time is given in Table 2 below which shows the markedly greater resistance to compression set brought about by the polymeric antioxidant.

TABLE 2
[Percentage compression set in silica filled methyl vinyl silicone vulcanisates in air at 200° C.]

|  | Percentage set | |
| --- | --- | --- |
|  | Compound 1 | Compound 2 |
| Time in days: |  |  |
| 2 | 42 | 22 |
| 4 | 62.5 | 32.5 |
| 8 | 86.6 | 44 |
| 12 | 96 | 60 |
| 16 | 100 | 70 |
| 20 |  | 77 |
| 24 |  | 84 |
| 28 |  | 88.5 |
| 32 |  | 91.5 |
| 35 |  | 93.5 |

Effect on vulcanisation

Normal antioxidants interfere with the peroxide initiated cross-linking process used with silicone rubbers but polymeric antioxidants in accordance with the present invention do not behave in the same way. The volume fraction, $V_r$ of rubber in the vulcansate swollen to equilibrium in benzene, is a measure of the cross-link density;

the higher V$r$ is, the higher the cross-link density. Table 3 below gives V$r$ for three compounds prepared above.

TABLE 3

| | V$r$ in benzene at 28° C. |
|---|---|
| Compound 1 | 0.31 |
| Compound 2 | 0.31 |
| Compound 3 | 0.30 |

Compound 1 has no polymeric antioxidant, and the closeness of the figures for V$r$ indicates that there has been substantially no interference with vulcanisation. However, had a normal non-polymeric antioxidant been used V$r$ would have been about 0.15.

We claim:
1. A composition comprising a silicone type rubber, a peroxide curing agent, in sufficient proportion to effect the cure of said silicone type rubber, and a stabilizingly effective amount of a polymeric antioxidant which consists essentially of a polymeric chain having a repeating unit $+$NHR—NHR$_1+$ wherein R is a divalent phenylene group and R$_1$ is a divalent condensed ring aromatic group having at least three rings.
2. A composition as claimed in claim 1 wherein the condensed ring aromatic group has at most four rings.
3. A composition as claimed in claim 1 wherein R$_1$ is a pyrenylene group.
4. A composition as claimed in claim 1 wherein R$_1$ and R$_2$ are p-phenylene and 3, 8-pyrenylene respectively.
5. A composition as claimed in claim 1 wherein the silicone type rubber is a methyl vinyl silicone rubber.
6. A composition as claimed in claim 1 wherein the polymeric aitioxidant material is obtained by reaction between hydroquinone and a diamino condensed ring aromatic compound containing at least three condensed rings.
7. A composition as claimed in claim 4 wherein the polymeric antioxidant material is obtained by reaction between hydroquinone and 3,8-diaminopyrene.
8. A composition as claimed in claim 1 wherein the polymeric antioxidant is present in a proportion of up to of the order of 4 parts by weight of silicone type rubber.
9. A composition as claimed in claim 1 when vulcanized.
10. A material which comprises a silicone type rubber which contains a peroxide curing agent in sufficient proportion to effect the cure thereof and an effective antioxidant proportion of a polymeric antioxidant which comprises essentially a polymeric chain in which —NH— groups alternate with divalent aromatic groups and the divalent aromatic groups are alternately phenylene groups and condensed ring aromatic groups having at least three rings.

References Cited

UNITED STATES PATENTS 2,389,802  11/1945  McGregor et al. ____ 260—448.2
3,438,910  4/1969  Schwarz _____ 260—2

SAMUEL H. BLECH, Primary Examiner

U.S. Cl. X.R.

260—2, 37, 47